United States Patent [19]

Gershman

[11] Patent Number: 5,110,147

[45] Date of Patent: May 5, 1992

[54] HIGHLY STABLE, CONTINUOUSLY ADJUSTABLE TRASH CAN TRANSPORTER

[76] Inventor: Leonard B. Gershman, 10853 Rose Ave., #55, Los Angeles, Calif. 90034

[21] Appl. No.: 558,666

[22] Filed: Jul. 27, 1990

Related U.S. Application Data

[63] Continuation-in-part of Ser. No. 269,421, Nov. 10, 1988, abandoned.

[51] Int. Cl.⁵ .............................................. B62B 11/00
[52] U.S. Cl. .................................... 280/79.5; 248/907; 280/408
[58] Field of Search ................... 280/79.2, 79.5, 79.11, 280/32.6, 35, 47.131, 408, 5.24; 248/907, 154

[56] References Cited

U.S. PATENT DOCUMENTS

| | | | |
|---|---|---|---|
| 1,321,713 | 11/1919 | Buie | 280/47.37 |
| 1,642,712 | 9/1927 | Angers | 280/5.24 |
| 2,808,220 | 10/1957 | Jones | 248/907 |
| 3,231,126 | 1/1966 | Cotney | 248/907 |
| 3,356,383 | 12/1967 | Sneed | 280/47.26 |

*Primary Examiner*—David M. Mitchell

*Attorney, Agent, or Firm*—Poms, Smith, Lande & Rose

[57] ABSTRACT

A transporter for carrying trash cans or bins includes a mainly circular platform which is provided preferably with three radially extending slots. Holding and guide rods or plates are mounted so as to extend vertically up through the slots, preferably to a height of at least one-fifth of the diameter of the platform. The holding rods or plates are continuously adjustable in the radial direction. The holding plates may either be curved in order to provide firm surface contact with the outer surface of a mainly cylindrical trash can, or may be angled so that two of the holding plates securely hold the trash bin along two corner edges, with the third angled holding plate providing double line contact along an opposite side of the trash bin. When using holding plates, the platform is provided with raised regins and ridges to provide lateral and radial stability to the plates. Two or more transporters may be coupled using a preferably single-strand connecting member, the ends of which fit into coupling holes provided in the platforms of adjacent transporters. By coupling several transporters, several trash cans or bins may be moved at the same time as a train.

6 Claims, 3 Drawing Sheets

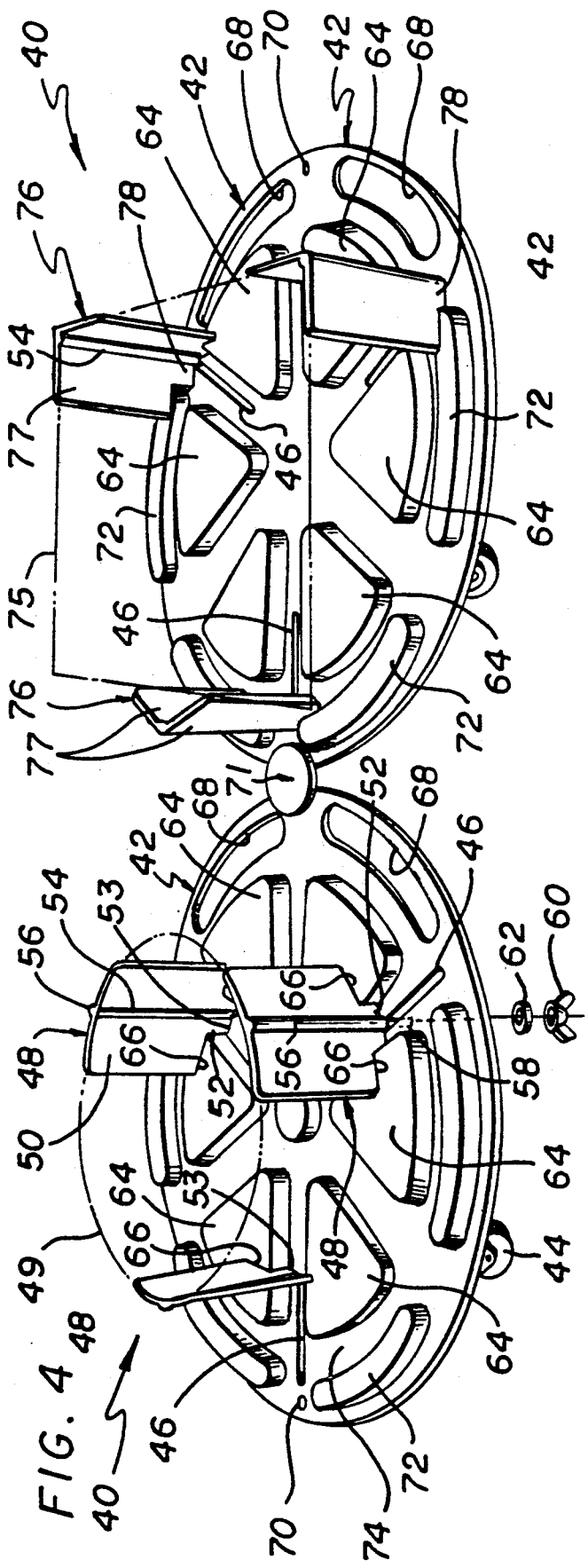

HIGHLY STABLE, CONTINUOUSLY ADJUSTABLE TRASH CAN TRANSPORTER

CROSS-REFERENCE TO RELATED APPLICATIONS

This application is a continuation in part of the U.S. patent application "Trash Can Transporter," Ser. No. 07/269,421, filed on Nov. 10, 1988 and now abandoned.

FIELD OF THE INVENTION

This invention relates to a transporter for moving trash cans which is continuously adjustable to adapt to trash cans of different sizes and shapes, and which holds trash cans and bins stably and securely even when moving over rough or slanted surfaces.

BACKGROUND OF THE INVENTION

Moving often unwieldy trash cans is a common chore, not only to those who are employed to do so, but also to homeowners. Consequently, many carts, dollies and other devices have been designed with a mind to making this often strenuous and unpleasant task easier and more convenient.

U.S. Pat. No. 4,103,919 (Greenheck, Aug. 1, 1978) describes a dolly which may be used for moving trash cans. The dolly described in this patent has a mainly square platform with caster wheels at each of the corners. The capped shafts of four bolts extend up through the platform in order to prevent a cylindrical trash can placed on the platform from sliding off to one side. The bolts are arranged at a first radial distance from the center of the platform. The bolts may, however, be moved to a second set of holes in the platform which are located at a smaller radial distance from the center. In this way, the dolly is able to accommodate only cylindrical trash cans of two different but nonetheless specific sizes.

The Greenheck device illustrates two of the most serious drawbacks of prior art trash can transporters. First, because there are only two positions for the bolts, trash cans which are to be loaded onto the dolly may only have one of two diameters. The limited adjustability of the Greenheck dolly therefore also limits its usefulness. Second, since the bolts which secure the dolly extend only a short distance above the surface of the platform, trash cans are liable to tip over and fall off the dolly, especially when being moved over rough areas such as curbs or over inclined surfaces such as many driveways.

An additional problem with using bolts to secure the trash can is that each bolt provides only a point contact with the surface of the trash can. Because of the poor holding ability of the short bolts in the Greenheck patent, the Greenheck dolly is not suitable for being linked together with other dollies to form a train to allow moving several trash cans at once. Furthermore, the Greenheck dolly is wholly unsuitable for trash cans which do not have circular bottoms.

Other texts which describe transporters, dollies, carts, etc., which may in some cases be used for trash cans, are:

U.S. Pat. No. 3,887,219 (Wilson, Jun. 3, 1975);
U.S. Pat. No. 3,831,959 (Fontana, Aug. 27, 1974);
U.S. Pat. No. 2,843,391 (Pelletier, Jul. 15, 1958);
U.S. Pat. No. 3,377,085 (Fralick, Apr. 9, 1961);
U.S. Pat. No. 3,726,535 (Longato, Apr. 10, 1973);
U.S. Pat. No. 3,058,755 (Baron, Oct. 16, 1962);
U.S. Pat. No. 2,818,271 (Saeli, Dec. 31, 1957);
U.S. Pat. No. 3,031,207 (Bard, Apr. 24, 1962);
U.S. Pat. No. 2,930,561 (Bittle, Mar. 29, 1960); and
British Patent No. GB1602-436 (Rose, Nov. 1981).

Each of these prior art transporters either fails to adjust to trash cans of different sizes and shapes, fails to hold the can securely, especially when moving over rough or slanted surfaces, is unsuitable for connection to other transporters to form a train, and/or is complicated and expensive to manufacture, operate or adjust.

It is accordingly the object of this invention to provide a trash can transporter which is easy to manufacture and handle, which is easily and continuously adjustable to accommodate trash cans of different sizes and shapes, which holds trash cans securely, even when rolling over rough or inclined surfaces, and which is suitable for connection in series to form a train for moving several trash cans at once.

SUMMARY OF THE INVENTION

According to one embodiment of the invention, a mainly circular platform is provided with a plurality of radially extending slots. A guide rod extends through each slot and upward above the surface of the platform at least to a height approximately one-eighth and preferably one-fifth of the diameter of the platform. Each guide rod can be secured in place radially using an easily loosened fastener such as a wing nut with suitable washers. Wheels are provided underneath the platform, with at least one wheel being a swiveled forward wheel. Coupling holes are provided in the front and rear of the platform. A preferably single-strand C-shaped connector may be hooked into the rear coupling hole of one platform and into the forward coupling hole of a trailing platform in order to form a train.

In a second embodiment of the invention, vertically extending plates are used instead of guide rods to provide even more secure holding of trash cans. The plates may either be curved, with a radius of curvature approximately equal to the curvature of a standard trash can, or may be shaped as angles in order to accommodate square, rectangular or other non-cylindrically shaped trash cans. In the second embodiment, the platform is preferably provided with raised regions to increase the lateral stability of the guide plates.

According to another aspect of the invention, the connector comprises a substantially circular disk to which a mainly U-shaped single-strand connecting member is secured. The "arms" of this U-shaped member extend downward through the forward and rear coupling holes, respectively, of adjacent transporters in a train. This improved connector reduces wobbling and the likelihood of accidental uncoupling of the transporters in a train.

According to yet another aspect of the invention, the platform is provided or manufactured with two downward extending curved side fenders which make it easier for the transporter to ride up over edges such as curbs or cracks.

BRIEF DESCRIPTION OF THE DRAWINGS

FIG. 4 shows two transporters according to a second embodiment of the invention coupled to form a train;

FIG. 5 shows a connector for connecting adjacent transporters in a train, and also shows the way in which the connector is installed; and FIG. 6 is a simplified illustration of a platform used in the transporter according to the invention which includes fenders which make it easier for the transporter to be pulled and to ride up over edges such as curbs.

DETAILED DESCRIPTION

Figure 1:
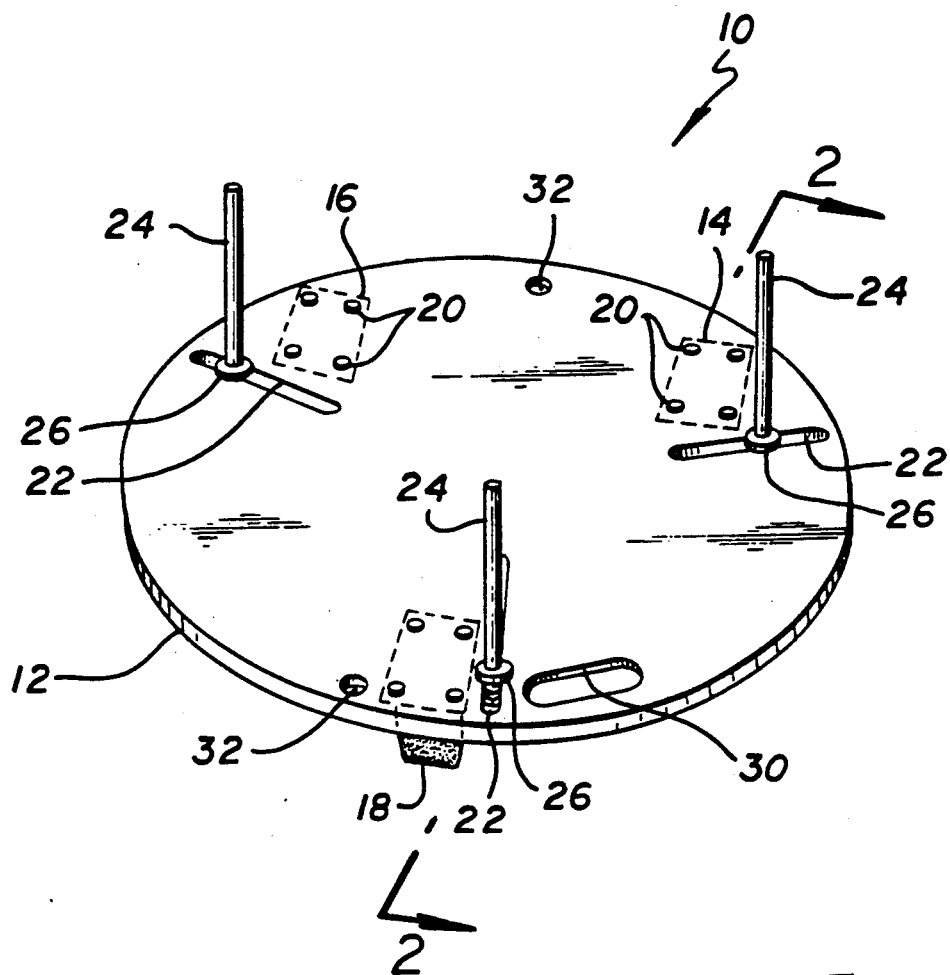
FIG. 1 is a perspective view of a first embodiment of the trash can transporter according to the invention.

FIG. 1 illustrates an example of a first embodiment of the trash can transporter according to the invention. This first embodiment is designated generally by the reference numeral 10. The transporter shown in FIG. includes a platform 12. In FIG. the platform is shown as being generally flat and circular. This circular shape, although advantageous in that it reduces the amount of material needed to manufacture the platform when it is to carry cylindrical trash cans, is not absolutely necessary. Furthermore, the platform may also be provided with raised portions which mate with recesses or against flanges in or on the bottom of trash cans if the transporter is to be used with specific trash cans.

The transporter 10 is provided with wheels 14, 16, 18 which are, for example, secured to the platform using bolts 20. The number of wheels is preferably three, since this is the minimum number of wheels which will provide adequate stability and maneuverability. Although all three of the wheels 14, 16, 18 may be swiveling, the two wheels 14, 16 are preferably non-swiveling rear wheels, with the wheel 18 being castered so as to form a swiveling front wheel.

Three radially extending slots 22 are provided in the platform. The slots 22 are preferably arranged with approximately 120° separation. A holding and guide rod 24 extends vertically upward, mainly perpendicular to the surface of the platform 12, through each slot 22.

Figure 2:
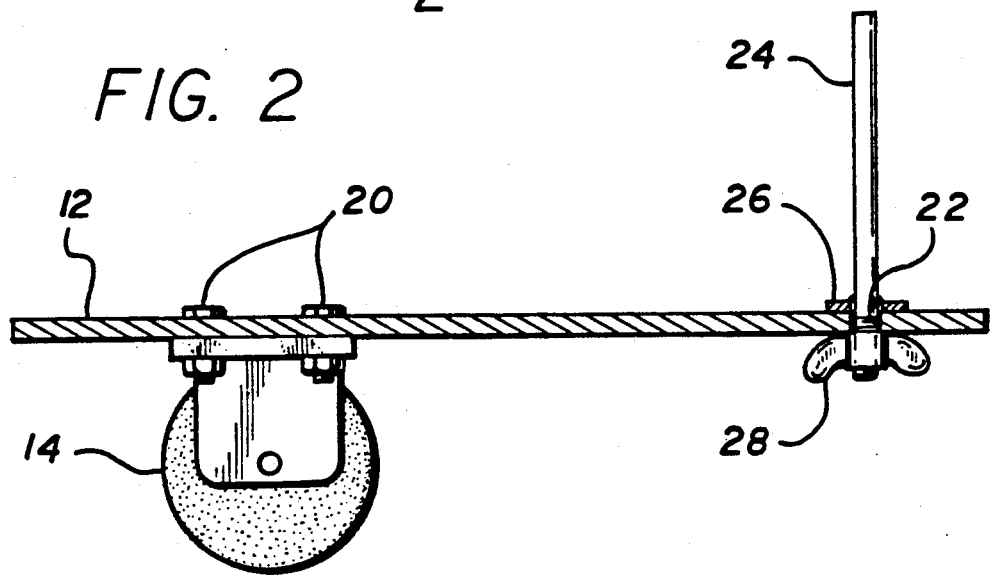
FIG. 2 is a cross-sectional side view of a portion of the first embodiment of the transporter, taken along line 2—2 in FIG. 1.

The rods 24 extend vertically to a height preferably equal to at least one-eighth the diameter of the platform 12. In order to hold the trash can most firmly and stably, however, it is preferable to have somewhat taller rods—at least one-fifth the platform diameter. With reference also to FIG. 2, each guide rod 24 is preferably formed as a threaded shaft and may be secured at any position along the corresponding slot 22 by tightening a fastener such as a nut or wing nut 28 onto the threaded bottom end of the guide rod 24. A washer 26, which seats against a groove (not shown) on the guide rod, or which is welded to the guide rod, spans the width of the slot to oppose the wing nut and secure the guide rod in position in the slot 22. Another washer (not shown) may also be provided between the wing nut and the undersurface of the platform to further increase the ability to tighten down the guide rod and to prevent wearing down and widening of the slot by the wing nut.

The radial position of each guide rod 24 is easily adjusted in its corresponding slot 22 by loosening the wing nut 28, sliding the guide rod radially in the slot to the desired position, and then retightening the wing nut 28. Assume for example that one wishes to move a generally cylindrical trash can on the transporter 10, and that one is unsure of the diameter of the trash can. One may simply loosen the wing nuts for each of the guide rods 24, move the guide rods radially outward, and then place the trash can on the platform 12, preferably so that it is centered on the platform. One then moves the guide rods inward until they contact the outer surface of the trash can, and one then tightens the respective wing nuts 28 for the guide rods 24. Of course, once this has been done, it is unnecessary to adjust the guide rods 24 again as long as the same trash can or a different trash can of the same diameter is to be moved on the transporter 10.

Naturally, by moving the guide rods, trash cans of other diameters are easily accommodated. The range of diameters of trash cans which may be moved on the transporter 10 is limited only by the radial extension of the slots 22. Depending on the strength and stiffness of the material chosen to make the platform 12, the slots may extend from as little as a few inches from the center of the platform out to less than one inch from the outer circumference of the platform. The length of the slots is, however, preferably at least onefourth the diameter of the platform, to provide a large range of continuous adjustability. In one knows in advance of manufacture, however, that the platform is only going to be used to move trash cans that have known diameters all less than one-half the diameter on the platform (so that a large range of continuous adjustability will not be needed), the slots may be made shorter than one-fourth the platform diameter; such shorter slots would also increase the strength and stiffness of the platform. Regardless of the length of the slots 22, however, the guide rods 24 will be continuously adjustable over the length of the slot.

In order to ensure that the trash can does not slide or wobble off of the platform 12, even when the transporter 10 is being pulled over uneven or slanted terrain, it is important that the the guide rods 24 extend sufficiently high above the upper surface of the platform 12. Preferred rod heights are given above. When the transporter 10 is to be used to move standard household trash cans, this means that the guide rods will be at least four to six inches long above the platform 12. One should note that by having guide rods 24 of such length, not only do the guide rods prevent the trash can from sliding off of the platform laterally, but they also strongly resist any tipping of the trash can. This is in contrast to prior art transporters which used only short bolts or similar holding elements to secure the trash can.

Referring especially to FIG. 1, coupling holes 32 are preferably made through the platform 12 at both the front and rear edges of the platform, that is, near the front wheel 18, and diametrically opposite the front wheel 18. An elongated opening 30 is preferably also made in the platform 12 close to its outer edge. This opening 30 preferably extends perpendicular to a radius of the platform. The purpose of the elongated opening 30 is to provide a handhold when carrying the transporter around or to permit hanging the transporter on a wall, for example in one's garage.

Figure 3:
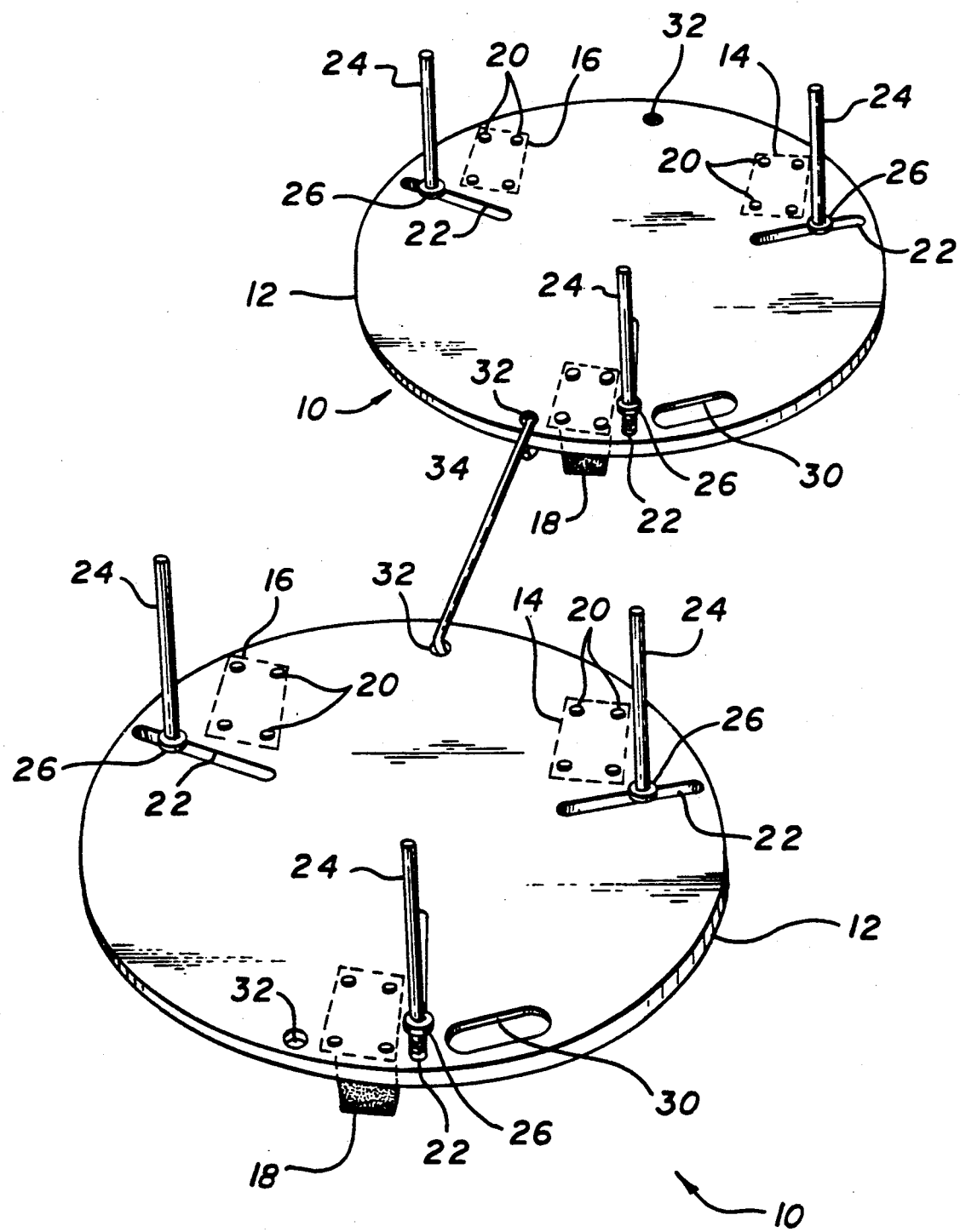
FIG. 3 shows two transporters according to the first embodiment connected in a train for allowing more than one trash can to be moved at a time.

FIG. 3 shows how two or more transporters 10 may be linked together according to the invention in order to form a train for moving more than one trash can at a time. A generally C-shaped connector 34 is provided with hooked ends. The connector 34 is preferably made of a stiff single-strand wire or rod. As FIG. 3 shows, the one end of the connector 34 is hooked in the rear coupling hole 32 of a lead transporter, while the other end of the connector 34 is hooked through the forward coupling hole of a following transporter. Of course, more than two transporters may be linked together, whereby a connector 34 is provided for each pair of transporters.

FIGS. 4 and 5 show a second embodiment of the trash can transporter according to the invention. In these figures, the second embodiment of the transporter is designated generally by the reference numeral 40. According to the second embodiment, the transporter includes a mainly circular platform 42, which is able to roll on wheels 44. As in the first embodiment, there are preferably three wheels distributed roughly equidistant in angle under the platform 42. As before, although all three of the wheels may swivel, preferably only a forward wheel (not visible in the figures) is swiveled, with the two rear wheels being fixed.

As in the first embodiment, radially extending slots 46 are made in the platform 42. The slots are preferably three in number.

In FIG. 4, two transporters 40 are shown linked together in a train. The only significant difference between the two transporters shown in FIG. 4 is the shape of holding plates used to hold a trash can on each of the transporters. The transporter shown to the left in FIG. 4 will be described first in order to illustrate features which are common to both transporters, and also to illustrate holding plates which are particularly suitable for holding cylindrical trash cans. The features unique to the transporter shown to the right in FIG. 4 are described later.

As shown in FIG. 4 for the left transporter, a curved holding plate 48 is provided for each slot 46. Each curved holding plate 48 includes a main portion 50 which has the general shape of a section of a cylinder to conform approximately to the outer surface of a cylindrical trash can (indicated by the dash-dotted circle 44). A base portion 52 of the holding plate 48 is narrower than the main portion 50 and extends downward below the bottom edge of the main portion to the upper surface of the platform 42. An inward extending flange or lip 53 is preferably also provided at the bottom edge of the base portion 52 in order to increase the stability of the holding plate.

A rigid threaded rod 54 is secured, preferably by means of a strong adhesive such as epoxy, to extend vertically down the middle of each holding plate 48. So that it does not stick out too far from the surface of the holding plate 48, the rod 54 preferably rests in a recess protruding from and down the back of the holding plate as a ridge 56. Both the rod 54 and the ridge 56 serve to stiffen the holding plate 48. Alternatively, the ridge 56 may be replaced by a tube or hole which is attached to or is made in the plate 48 and into which the rod 54 is securely inserted.

The bottom end 58 of the rod 54 is preferably threaded and, when its corresponding holding plate is mounted on the platform, extends beneath the platform 42. As before, a wing nut 60 or other suitable fastener is screwed onto the threaded end 58 and tightens down against the underside of the platform 42, preferably via a washer 62, in order to hold the holding plate 48 in place radially in the slot 46.

The platform 42 in the second embodiment of the transporter 40 also has a number of raised regions 64. In the illustrated embodiment, there are six such raised regions 64, two for each of the three holding plates 48. Each raised region 64 has generally the shape of a "pie slice," that is, each raised region 64 may be described roughly as an angular sector of a disk. The height of each raised region 64 is approximately equal to the height of the base portion 52 of each holding plate 48. The slots 46 extend between pairs of raised regions 64. Lower edges 66 of each main portion 50 on either side of the threaded rod 54 of each holding plate extend over one of the raised regions 64. In other words, the holding plates 48 are installed in the platform 42 by inserting the base portion 52 of each holding plate between two raised regions 64 with the threaded end 58 of the rod 54 extending through the slot 46. The raised regions 64 thus serve to stabilize the holding plates 48 by substantially preventing lateral movement or wobbling of the plates; they also tend to increase the stiffness of the platform 42.

In FIG. 4, six raised regions are shown. Although having several raised regions increases the strength of the platform 42 somewhat, it is not necessary to have two raised regions for each holding plate. Instead, the raised regions between each pair of holding plates 48 could merge to form a single larger raised region which still provides full lateral support for the holding plates.

Elongated handhold openings 68 are preferably also made near the forward edge of each platform 42. As before, these handhold openings 68 are useful, not only for carrying the transporter 40, but also when storing the transporter by hanging it, for example, on a peg or nail in one's garage. Although two handhold openings 68 are shown for each platform 42 in the illustrated second embodiment, the number of openings may be varied from zero to several.

As in the first embodiment, the second embodiment of the transporter 40 preferably has coupling holes 70, one at the front edge and one at the rear edge of the platform 42. As FIG. 4 shows, the coupling holes are preferably located diametrically opposite one another. A connector 71 is also provided for coupling two transporters so as to form a train. The connector 71 is described in greater detail below.

Radially outward from the raised regions 64, the platform 42 preferably has several ridges 72, which simply constitute raised regions of a different shape and placement. Non-raised regions 74 are thus created between the ridges 72 and the raised regions 64. The non-raised regions 74 are preferably formed at a radial distance approximately equal to the radius of the bottom of the most common type of household trash can. When such a trash can is placed on the platform 42, the bottom flange normally found on such trash cans will fit in the nonraised region 74 so that it will ride even more securely and stably on the platform 42. It is, however, not necessary to provide the ridges 72. Instead, the sections of the platform where the ridges are made could be left flat or could be turned into additional handhold openings such as the opening 68. Also, the raised regions 64 could extend radially outward so far that they would merge with and thus replace the ridges 72. One can better understand the principal function and advantage of the ridges 72 are, however, by considering the configuration of the holding plates shown for the transporter to the right in FIG. 4.

As the outlined square 75 indicates in FIG. 4, the transporter 40 to the right is configured to hold and move a square or rectangular trash can or bin. The right transporter includes a platform 42 which is identical to the platform used in the left transporter. In order to arrange the transporter according to this invention to carry non-circular trash bins, angled holding plates 76 are used instead of the curved holding plates 56 in the left transporter. As FIG. 4 shows, the angled holding plates 76 include two substantially planar main portions 77, which intersect along a mainly vertical centerline, and two base portions 78 which are essentially extensions of the main portion 77.

The height of the holding plates 48, 76 (and of the rods 24 in the first embodiment) is preferably at least one-fifth of the diameter of the platform 42 itself in order to provide the most firm and stable holding of the trash can. Although the height may be varied according to need and may be reduced, this minimum height ensures secure holding of trash cans and bins and allows the holding plates to prevent not only sliding but also tipping of the trash receptacles, while still enabling the user to lift the trash receptacles from the platforms without unnecessary hindrance. This height also allows one to use the handle of the trash can (or of the lead trash can in a train) to pull the trash can along on the transporter without risking that the trash can will tip over or slide off the platform. If the height is reduced, for example if one knows that the transporter will seldom have to move over bumps or edges, the height of the plates should still preferably be at least one-eighth the diameter of the platform.

As with the curved holding plates 48 used on the transporter 40 to the left in FIG. 4, the angled holding plates 76 used on the right transporter include a threaded rod 54 which extends vertically, approximately along the centerline, and is secured to the holding plate 76, preferably using some adhesive such as epoxy. The rod 54 on the angled holding plate 76 is preferably identical to the rod 54 on the curved holding plates 48 and will thus not be described in greater detail. Also, as was described in connection with the left transporter in FIG. 4, wing nuts and washers are preferably also provided to secure the holding plate 76 on the platform 42.

In order to load a square or rectangular trash can or bin onto the transporter, the angled holding plates 76 are moved outward in the slots 46. The trash can is then placed on the platform 42 so that two adjacent edges of the trash bin are roughly aligned with two of the slots 46. The angled holding plates 76 may then be moved inward radially so that the two corners of the trash bin fit securely in the two holding plates 76. The main portions 77 of the two holding plates then provide secure surface contact with the sides of the trash bin.

Of course, it is not possible for three angularly equidistant holding plates each to hold a corner of a square bin. FIG. 4 shows the manner in which secure contact is nonetheless provided according to this invention. By looking at the leftmost angled holding plate 76 on the right transporter, one will see that by sliding this holding plate 76 radially inward, the outer edges of its main portions 77 will contact the side of the trash can or bin, not just along one line of contact, but two. Even a square or rectangular trash bin can thus be held securely on the platform 42 using the three holding plates 76 and adjusting them to fit the size of the trash can by moving the plates in the slots 46.

As is best seen by looking at the upper right holding plate 76, lateral stability of the plate 76 is increased by the raised regions 64 and the ridges 72. Because at least one holding plate 76 must normally be rotated to fit the approximately 90° corner of the trash bin, one of its main portions 77 will extend over one of the ridges 72, with the other main portion 77 extending over one of the raised regions 64. The ridge 72 and raised region 64 thus lessen any tendency of the holding plate 76 to wobble.

In FIG. 4, the dash-dotted square 75 indicates that the corner-to-corner width of the trash bin is approximately equal to the diameter of the transporter 42. For smaller trash bins, the holding plates 76 will of course be moved radially inward in their respective slots, and for small enough trash bins, the raised regions 64 alone will be able to support the main portion 77 of the holding plates 76. If one knows in advance that trash cans to be moved using this invention have some irregular shape, one may of course design the geometry of the holding plates accordingly so that they either have the proper curvature, the proper angle, or even some combination of these two properties.

FIG. 5 illustrates the way in which two transporters may be coupled to form a train for moving more than one trash can or bin at a time. As FIG. 5 shows, the connector 71 comprises a disk 80 to which is secured a preferably single strand connecting bar 82, which is shaped generally as an upside down "U" As FIG. 5 shows, two transporters are easily coupled to one another by inserting the two ends of the connecting bar 82 of the connector 71 into the forward and rear coupling holes 70, respectively, of the transporter platforms. The disk 80 makes it easier to hold, insert and remove the connector 71. The disk also serves to prevent wobbling of the connector 71 which otherwise might lead to the connector wobbling or shaking out of the coupling holes 70, especially when the transporter is being dragged across an uneven or rough surface.

Because the holding plates 48, 76 of this invention securely hold trash cans and bins on the platforms 42, if there is a handle on the forwardmost trash can or bin, it may be used to drag the transporter and can along. If none of the trash cans or bins has a handle, one may alternatively connect a leash, for example in the forwardmost coupling hole 70, which otherwise will be unused, through one or both of the forward handhold openings 68, or to some other part of the transporter or trash receptacle.

FIG. 6 shows a feature of the invention which is particularly advantageous when the trash can transporter is to be used to move trash cans over uneven surfaces such as curbs. In FIG. 6, the platform 42 of the transporter is shown in a simplified, smooth planar form. It is to be understood, however, that this feature of the invention may be used with any of the platforms described above. As FIG. 6 shows, a curved fender 84 is provided at either side of the platform 42, preferably radially outward and partially covering each rear wheel 44. Both the platform 42 and the fenders 84 are preferably formed as a unit. However, the fenders may also be manufactured independently and secured later to the platform 42 by means of clamps or some other known method. Furthermore, although it will normally not be necessary and would increase the cost of the otherwise very inexpensive and easily manufactured transporter according to the invention, metal strips may be attached to the bottom edges of the fenders 84 in order to serve as shock plates to extend the life of the transporter when it has to be dragged over curbs and the like very often.

As was mentioned above, the platforms 12 and 42 are preferably made as units. The preferred material for both the platforms and the holding plates 48, 76 is any highly impactresistant moldable plastic. Metal may, however, also be used. The disk 80 of the connector 71 is preferably also made of an impact-resistant plastic and will typically be made of the same material as is used to make the platforms and the holding plates.

Referring to FIG. 4, a working prototype of the invention had the two rear wheels fixed, with the front wheel swiveling. The platform 42 in the prototype had a radius of approximately twelve inches. Six raised regions 64 were angularly equally spaced around the platform and extended radially from approximately three inches from the center of the platform to approximately nine inches from the center. The ridges 72 extended angularly an amount equal to the angular extent of the adjacent raised region 64 and extended radially from approximately ten inches from the center of the platform 42 out to approximately eleven and one-half inches from the center. Both the raised regions 64 and the ridges 72 were approximately three-fourths of an inch high above the nonraised portions of the platform 42.

The slots 46 were approximately one-eighth inch wide and extended from slightly more than four inches from the center of the platform 42 radially outward to a distance of approximately eleven inches from the center. The length of the slots in the protype thus fell in the range of length from about one-half to about two-thirds the radius of the platform. The platform itself was made of a highly impact-resistant plastic, approximately one-sixteenth inch thick. For many applications, however, the platform should preferably be thicker to increase its strength and stiffness. Measured from vertical edge to vertical edge, the curved holding plates 48 were approximately five and one-half inches wide. The base portions 52 of the curved holding plates 48 were roughly two inches wide. The total height of the curved holding plate 48 above the platform 42 was approximately six inches (that is, approximately one-half the radius of the platform), with a little less than five and one-half inches being taken up by the height of the main portion 50 of the plate 48. The lip or flange 53 at the base portion 52 was about one-quarter of an inch wide. The holding plate 48 was manufactured of the same impact-resistant plastic as the platform 42, and had a radius of curvature approximately equal to that of the platform, that is, roughly twelve inches.

The threaded rod 54 in each holding plate 48 extended approximately one-half inch beneath the flange and through the respective slot 46 and was secured using a washer and wing nut as shown in FIG. 4.

For many conventional trash cans, the diameter of the platform 42 should be chosen in the range of twenty to forty inches, but it may be chosen smaller or larger as needed to adapt the platform to specific, known trash can or bin sizes.

The slots allows for a continuous range of adjustability over the entire radial length of the slots 46. This continuous range of adjustability, measured from the center of the platform, should preferably be from about one-third to one-half of the radius of the platform out to at least three-fourths. This range of adjustability will allow the transporter according to this invention to accommodate almost all standard household trash cans.

One should note that the guide rods and holding plates are easily removed, leaving only the substantially flat platform and its wheels. Even several transporters may be stored easily, for example by hanging them on a peg or rod in one's garage, since their respective platforms are compact. The invention thus provides not only compactness when disassembled but also high and secure holding rods and plates when assembled.

Numerous alternatives to the described first and second embodiments have been mentioned in connection with the description of the embodiments themselves. Other design alternatives are also within the scope of this invention. For example, the platform 42 in the second embodiment could be made without any raised regions or ridges at all. In such case, the holding plates 48 or 76 should extend all the way down to the surface of the platform itself in order to provide greater lateral stability and prevented wobbling sideways. Such an arrangement would, however, not provide the stability against wobbling in the radial direction which will otherwise tend to occur. The raised regions 64 and ridges 72 according to the invention effectively prevent such radial wobbling.

Other alternatives to the described embodiments would have more than three holding rods or plates on each platform and the number of wheels may also be increased. For example, if one knows that most of the trash receptacles to be moved on the transporter are square or rectangular, it may be found preferable to include four slots and right-angled holding plates 76 rather than three. By distributing the slots and angled holding plates with a 90° separation, each corner of the square or rectangular bin could then be individually held and secured. Also, in such case, the platform may be made square or rectangular, and other platform shapes may also be chosen. Regardless of the shape of the platform, however, it will have a minimum width or radial extension which will determine the size of the largest trash can or bin which the platform can accommodate. The three holding plates illustrated and described in connection with the second embodiment of the invention will, however, normally be quite adequate to move even square and rectangular bins while reducing the number of parts needed for the transporter and the manufacturing costs.

All such alternatives are naturally encompassed in the following patent claims.

I claim:

1. A trash can transporter train assembly comprising:
   a plurality of substantially flat circular platforms supported on wheels, with each platform having a center and a minimum diametral platform extension;
   means for coupling said platforms together including coupling holes formed in a front and in a rear portion of each platform and a connector including a substantially U-shaped single strand connecting element with ends fitting into the rear coupling hole of a lead platform and into the forward coupling hole of a following platform;
   a plurality of guide members adjustably positionable on each said platform to permit trash cans of a variety of sizes to be removably positioned on said platform, each of said guide members being continuously adjustable over a radial distance at least equal to one-fifth of the radius of said platforms;
   continuously adjustable attachment means for securing the guide members of each platform in corresponding ones of the slots of the corresponding platform; and
   the height or vertical extent of said guide members above the surface of said platforms being at least equal to one-fourth the minimum diametral platform extension;
   whereby said guide members may be adjusted to fit trash cans of different sizes, and the accurate fit and substantial height of the guide members precludes spilling, even when a plurality of said platforms is pulled over an uneven surface.

2. A trash can transporter train assembly as defined in claim 1, wherein at least one trash can constitutes a lead trash can with at least one handle, and wherein each said platform is compact and free of structure extendable above said height of said guide members, whereby motive power for moving said trash can train assembly is to be provided by the user gripping one of the handles of the lead trash can.

3. A trash can transporter comprising:
a substantially flat platform supported on wheels and having a center, a perimeter, and a minimum diametral platform extension;
a plurality of radially extending openings in the platform forming guide slots;
a plurality of guide members adjustably positionable on the platform along the guide slots, whereby each guide member is a plate with a main portion and a base portion narrower than the main portion;
adjustable attachment means for securing the guide members in corresponding ones of the slots;
each of said guide members being continuously adjustable over the length of the corresponding slot to fit trash cans of a variety of sizes and to permit the trash can to be removably positioned on the platform while precluding spilling of the trash can, even when the platform is pulled over an uneven surface; and
said platform including raised regions on either side of each guide slot, with the main portion of each plate extending over adjacent raised regions and with the base portion of each plate fitting substantially between the adjacent raised regions, for stabilizing the plates when they are mounted on the platform.

4. A trash can transporter as defined in claim 3, in which the raised regions are of a first type and a second type, with the raised regions of the first type being shaped substantially as sectors of disks and being located closer to the center of the platform than the raised regions of the second type, which form peripheral ridges on the platform.

5. A trash can transporter comprising:
a substantially flat platform supported on wheels and having a center, a perimeter, and a minimum diametral platform extension;
a plurality of radially extending openings in the platform forming guide slots with a length at least equal to one-eighth the minimum diametral platform extension;
a plurality of guide members, each being a plate with a main portion and a base portion narrower than the main portion, adjustably positionable on the platform along the guide slots, each with a vertical extension above the platform equal to at least one-eighth of the minimum diametral platform extension;
adjustable attachment means for securing the guide members in corresponding ones of the slots;
each of said guide members being continuously adjustable over the length of the corresponding slot to fit trash cans of a variety of sizes and to permit the trash can to be removably positioned on the platform while precluding spilling of the trash can, even when the platform is pulled over an uneven surface,
in which,
a securing rod forming a spine of substantially the same height as the plates is rigidly attached mainly vertically to each of the plates, with a bottom end of each securing rod extending through a respective one of the guide slots for mounting the corresponding plate on the platform.

6. A trash can transporter as defined in claim 5, in which the main portion of the plates is formed as two mainly planar halves for conforming to the edges of square and rectangular trash cans.

* * * * *